United States Patent
Chmelev et al.

(10) Patent No.: US 9,418,097 B1
(45) Date of Patent: Aug. 16, 2016

(54) LISTENER EVENT CONSISTENCY POINTS (71) Applicant: EMC Corporation, Hopkinton, MA (US)

(72) Inventors: Dmitri Chmelev, Renton, WA (US); Rachel J. Hestilow, Seattle, WA (US); Justin M. Husted, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 196 days.

(21) Appl. No.: 14/227,388

(22) Filed: Mar. 27, 2014

Related U.S. Application Data (60) Provisional application No. 61/905,022, filed on Nov. 15, 2013.

(51) Int. Cl.
G06F 17/30 (2006.01)

(52) U.S. Cl.
CPC .... G06F 17/30371 (2013.01); G06F 17/30115 (2013.01)

(58) Field of Classification Search
CPC combination set(s) only.
See application file for complete search history.

(56) References Cited

U.S. PATENT DOCUMENTS

| | | | | |
|---|---|---|---|---|
| 7,756,898 | B2 * | 7/2010 | Passey | G06F 9/542 707/793 |
| 2006/0085669 | A1 * | 4/2006 | Rostron | G06F 11/1489 714/4.12 |
| 2008/0005061 | A1 * | 1/2008 | Kraft | G06Q 30/0637 |
| 2008/0126827 | A1 * | 5/2008 | Fricano | G06F 12/0808 713/600 |
| 2011/0252091 | A1 * | 10/2011 | Chitturi | G06Q 10/10 709/204 |
| 2012/0284317 | A1 * | 11/2012 | Dalton | G06F 17/301 707/827 |

* cited by examiner

*Primary Examiner* — Etienne Leroux
(74) *Attorney, Agent, or Firm* — Sean M. Evans; Krishnendu Gupta (57) ABSTRACT

Implementations are provided herein for sending event notifications based on modifications to files and/or directories. When a file is read, modified or changed under the conditions for a registered event notification, a consistency point can be established. An impact list can then be determined based on the target. It can then be determined whether the version of event caches associated with the files and folders identified in the impact list match a global event cache version determined at the time of the consistency point. If the event caches are an old version, the system call can be restarted, and the event caches can be rebuilt to the current version. If the event caches of the impact list are current, the file system operation can be performed, and notifications can be sent based on the set of listeners identified within the current set of event caches.

20 Claims, 6 Drawing Sheets

LISTENER EVENT CONSISTENCY POINTS

CROSS-REFERENCE TO RELATED APPLICATIONS

This application claims priority to U.S. Provisional Patent Application No. 61/905,022 for Listener Event Consistency Points filed Nov. 15, 2013, which is incorporated herein by reference for all purposes.

FIELD OF THE INVENTION

This invention relates generally to processing data, and more particularly to systems and methods for establishing and sending event notification in a distributed storage environment.

BACKGROUND OF THE INVENTION

Distributed file systems offer many compelling advantages in establishing high performance computing environments. For example, they can provide storage for millions of files and provide simultaneous access by many disparate users. When many different users have access to a file system, there is a need to track changes made to files by one user or a group of users that could impact a second set of users. One way to accomplish this is to provide the ability to set up listeners that track changes to target files and/or target directories, and upon a detected triggering event, send a notice to a user or a group of users that the triggering event has occurred to the target.

As a means to provide notification to users when a triggering event occurs, a list of user or automated established listeners can be stored in a listener index. However, in a distributed file system, synchronizing changes within the listener index between distributed blades or nodes of the distributed file system can present challenges. For example, when a listener is created, all nodes within a distributed file system environment may need to update a listener index to reflect the newly created listener. Without synchronization of the listener index, a triggering event may be missed while the listener is still within the process of being registered on every node. Another similar problem may arise when a set of listeners change in the middle of a file system operation that triggers multiple listener events. In this case, a subscriber to the listener may receive notice that only some of the set of listener subscribed events were triggered. Thus, the user could have extreme difficulty in determining which listeners in the listener index were honored for a file system operation. Thus, it is desirable that users should have confidence that either every listener event in a newly registered set of listeners is honored or none of the listener events in the newly registered set of listeners were honored.

One method for providing a consistent experience would be to provide isolation between processing a file system operation that triggers events and processing a listener event changes by the means of a single distributed lock of the entire file system. In this sense, a consistent outcome is provided to a user. However, distributed file system locks may create delays or bottlenecks for other activity within the file system. Thus, in managing interactions between nodes of a distributed file system, there exists a need to provide a consistent experience to end users for tracked changes that also does not necessitate a distributed file system lock or other locking means that can create lengthy delays or bottlenecks for general file system activity.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a listener registration to register a listener to a target can be received, wherein the target is at least one of a file or a directory. The listener registration can be added to an initiator list on an initiator node. The listener registration can be sent to a set of participant nodes. The set of participant nodes can register the listener registration and send a registration notice to the initiator node. A set of registration notices can be received from the set of nodes by the initiator node. The initiator node can determine whether the received set of registration notices accounts for all nodes in the set of nodes. In response to determining the set of registration notices account for all nodes in the set of nodes, the listener can be activated and the set of event caches can be invalidated based on the target.

In accordance with another aspect, a file system operation associated with a target can be received, wherein the target includes at least one of a target file and a target directory. In response to the receiving, a notification consistency point can be established based on a current global event cache version. An impact list can be determined based on the file system operation and the target, wherein the impact list includes a set of files and directories impacted by the system call. A set of event caches associated with members of the impact list can be validated. A set of listeners can be established based on the set of event caches. The file system operation can be performed. A set of notification can be sent based on the set of listeners.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Implementations are provided herein for enabling an event notification system within a distributed file system. To establish an a new event subscription, a user or administrator can register a listener to target file(s) and/or directory(s). The listener can be configured to monitor, for example, when a file or directory is deleted, when a file or directory's content is changed, when the size of a file or a directory is changed, when a file or directory is renamed, when a file is read, etc. When a node of a distributed file system receives a listener registration request, the listener registration can be added to an initiator list within the node. The listener registration can then be sent to the entire set of nodes within the distributed file system. In response to sending the registration notices, the initiator node can receive a set of registration response notices from the entire set of nodes, informing the initiator node that the listener registration has been registered on each node. If a registration response notice is received from every distributed node, the listener is activated, and a global event cache version number is increased to a subsequent version number. It can be appreciated that at this point, listener events can be delivered to the subscriber as the listener is activated. Increasing the global event cache version can render existing event caches associated with individual files and directories invalid due to a subsequent registration of a new listener. If a registration notice is not received from every distributed node, a listener removal message can be sent to the set of nodes that instructs nodes to remove the listener registration. Once the initiator node receives confirmation from the set of distributed nodes that the listener registration has been removed from each node, the listener registration is removed from the initiator list on the initiator node.

Additional implementations are provided herein for sending event notifications. When a file is accessed, modified or changed under the conditions for a registered event notification, a consistency point can be established. For example, the consistency point can be established based on a current global event cache version number. An impact list can then be determined based on the target. For example, if a file is renamed, the impact list may include inodes that reference the original file and parent directory of the file along with a destination file and destination parent directory, i.e., the name and directory location of the file after the rename. It can be appreciated that the impact list can identify parent and child directories and/or files impacted by the file system operation. It can then be determined whether the version of event caches associated with the files and folders identified in the impact list match the global event cache version determined at the consistency point. If the event caches are an old version, the system call can be restarted and the event caches can be rebuilt, as described in more detail with respect to FIG. 2. If the event caches of the impact list are current, the file system operation can be performed, and notifications can be sent based on the set of listeners identified within the current set of event caches.

It can be appreciated that the implementations as described herein for registering listener events and performing file system operations do not rely on isolation from each other for consistent performance. No distributed file system locks are implemented, as triggered listener events will not be delivered, and listener events will not be activated until all participants have recorded the listener registration update. In addition, as described herein in processing a system call associated with a file system operation, notification consistency points are established and batch messaging can be used to ensure subscribers to listeners do not receive partial results to a set of listener events.

The term "inode" or "logical inode" ("LIN") as used herein refers to in-memory representation of on-disk data structures that may store information, or meta-data, about files and directories, such as file size, file ownership, access mode (read, write, execute permissions), time and date of creation and modification, file types, data protection process information, etc. In at least one implementation, LIN data structures may contain a listing of registered listener mappings and event cache data. In one implementation, LIN's may be in a known location in a file system, for example, residing in cache memory for fast and/or efficient access by the file system. Before or in conjunction with performing a file system operation on a file or directory, the system call may access the contents of the LIN and/or the contents of the file in determining how to process the system call. In some implementations, a data structure explicitly named "inode" or LIN may be absent, but file systems may have data structures that store data similar to LINs and may provide capabilities similar to LINs as described herein. It can be appreciated that the concepts and implementations as provided herein are functional using data structures not termed LINs or inodes but that offer the same functionality to the file system.

The term "file system operation" refers to file or directory access and/or actions by a user or automated processes of the file system. For example, operations directed to files and/or directories to delete data, write data, read data, change data size, change data type, modify data, modify metadata, rename data, link data, unlink data, add/remove/modify data permissions, data protection processes, etc. can all be classified as file system operations. It can be appreciated that these are just examples of file system operations and that individual file systems and distributed file systems can have a larger variety of file system operations or different terminology for performing the same or similar functionality as described herein. The term "system call" is the process that performs file system operations.

The term "listener" refers to a process established to monitor a file, directory or a group of files and/or directories for predetermined behavior. For example, a listener can be established that monitors a file for write operations, e.g., the file content is being changed. In another example, a listener can be established for when the number of links associated with a file and/or directory is changed. In yet another example, a listener can be established for a file and/or directory being renamed. It can be appreciated that the types of events that can be monitored is limited only by the file system's ability to track particular types of events. In some implementations, the listener is associated with a user and/or a set of users such that when the listener is triggered the user or set of users is sent a notification regarding the listener being triggered.

The term "initiator" refers to a single node in a set of nodes where a listener registration originates from. The term "participant" refers to the non-initiator nodes in the set of nodes, e.g., all other nodes except for the initiator node can be deemed participant nodes, for each individual listener. An "initiator list" refers to a set of individual listeners that are registered on the initiator. It can be appreciated that listeners are registered on the initiator in its initiator list such that individual initiators that host listener subscriptions are the final recipients of data indicating the listener event has been triggered, such that the initiator can then process the listener event notifications. An "initiator file" is a single aggregated representation of all listeners on a node. An initiator file stores the union of the scope of listeners including file system operations that trigger each listener. The initiator file can also store all active registered listener events received from other nodes that have not been removed. A "participant event file" is an in-memory data structure on the participant side that is created/updated when registration data is received from the initiator. It can be appreciated that the participant event file is the participant view of the listeners, so, for example, for listeners registered on a file/directory A, there will be a participant file that stores the list of initiators and unified scope for listeners that are registered on file/directory A across the entire distributed file system. It can be appreciated that a node can be both an initiator for a first listener registration and concurrently be a participant for the same listener registration. For example, when an initiator node performs a system call and/or file operation that triggers a listener event on its own initiator list.

The term "event cache" refers to a portion of the LIN or other metadata associated with a file and/or directory that lists or points to a set of listeners associated with the file and/or directory. For example, when a file system operation runs, the system call needs to determine whether the file system operation is within the scope of a file and/or directory that has a registered listener and if so, what node is the initiator node for that listener. The file system operation potentially triggering the listener event can then be sent to the initiator node from the participant node processing the system call, where the initiator can be responsible for notifying subscribers of the listener. Thus, each participant node stores a mapping, i.e., the event cache, between files and/or directories that have registered listeners and the nodes that need to be identified. Without the event cache, the file system operation on a target would need to evaluate whether the target or its parents have entries in their maps to determine whether a listener is active for the target. In one example, an event cache associated with a file can list An event cache version number that identifies when the event cache was last validated, a set of mappings to a set of participant event files that identify subscribed listeners along with the scope of the listener and file system operations that trigger each individual listener, etc. The contents of the event cache, and its functionality, will be described in greater detail with regards to FIGS. 1 and 2 below.

The term "global event cache" is the current global version of event caches. When a new listener is registered, or when a listener registration is changed, the global event cache can be updated to a subsequent version, essentially invalidating any event cache based on a previous version of the global event cache. The function of the global event cache will be described in greater detail with regards to FIGS. 1 and 2 below.

The above referenced defined terms as well as implementations as described herein relating to distributed network implementations of listener event notification systems are further supplemented by "Systems and Methods for notifying listeners of events" U.S. Pat. No. 7,756,898 and "Systems and Methods for notifying listeners of events" U.S. Pat. No. 8,005,865 and are incorporated herein by reference.

Figure 1:
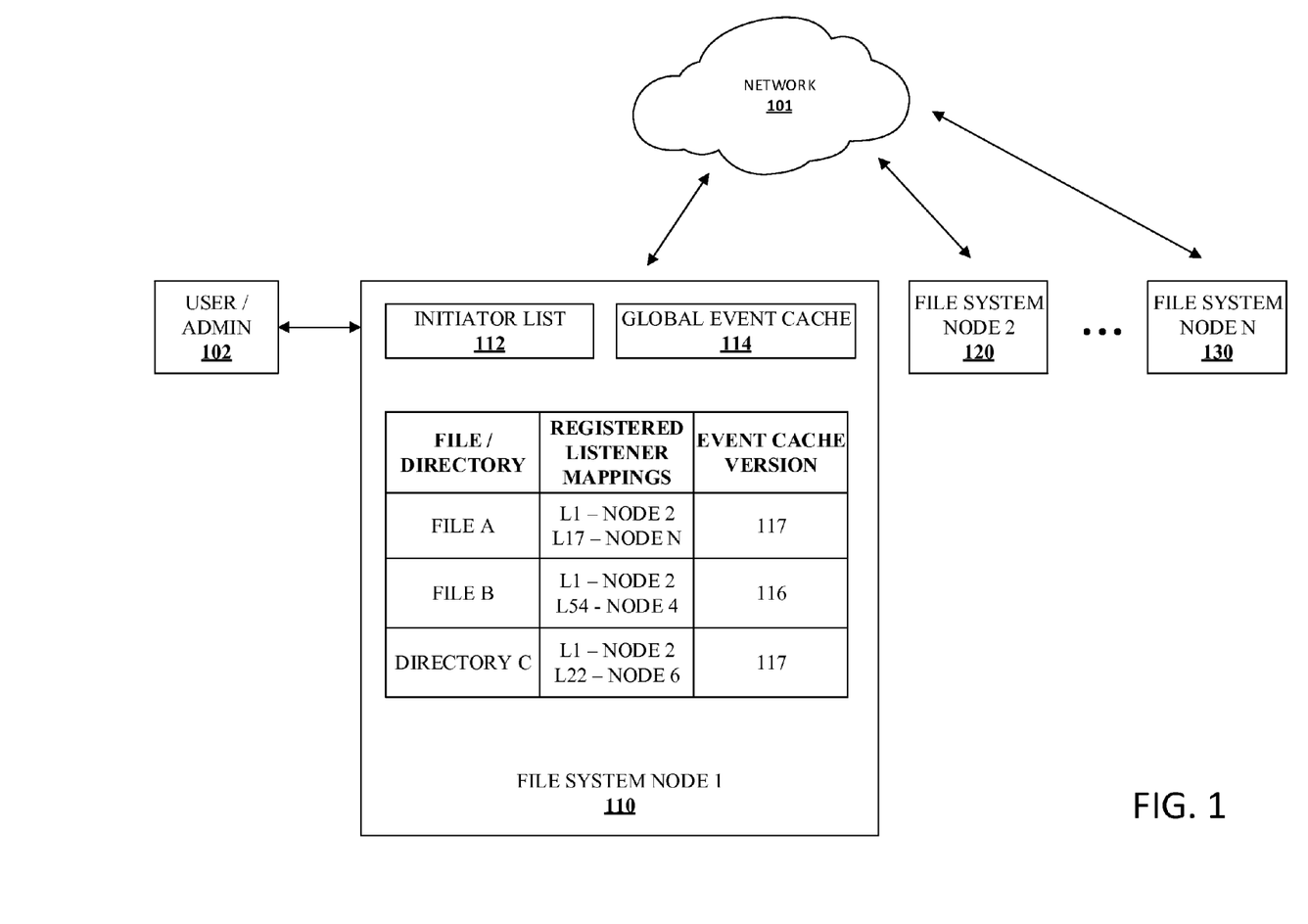
FIG. 1 illustrates an example distributed file system including an initiator list, a global event cache, and an example file/directory mapping in accordance with implementations of this disclosure.

Referring now to FIG. 1, there is illustrated an example distributed file system including an initiator list, a global event cache, and an example file/directory mapping in accordance with implementations of this disclosure. File System Node 1 110, File System Node 2 120, and File System Node N 130 (where "N" is an integer) comprise a distributed File System, also sometimes referred to as a cluster of nodes, and as more fully described with respect to FIGS. 5 and 6. As illustrated in FIG. 1, File System Node 110 is comprised at least of an initiator list 112, a global event cache 114, and an example partial LIN table. It can be appreciated that File System Node 110 is comprised of additional components, including a processor, memory, I/O interface, etc., as more fully described with respect to FIG. 6. It can be further appreciated that File System Nodes 120, 130, etc., are comprised of similar components as to File System Node 110 and are depicted here to show the distributed nature of the File System.

Establishing a New Listener

In one example, a user and/or admin (hereinafter "user") can access file system node 110 either directly, as depicted in FIG. 1 and as illustrated in more detail with regards to FIG. 6, or through network 101. It can be appreciated that the user 102 can interact through a File System user interface ("UI") or via a programmable interface. User 102 can use the File System UI to establish a listener. In one implementation, User 102 can choose from a list presented in the UI for file system activity that the user wishes to be monitored. In another implementation, the user can use an application programming interface to specify which events to monitor. User 102 can attach or associate the listener with individual files, a set of files, an individual directory, a set of directories, or a set of files and directories. The file(s) and/or directory(s) attached or associated with the listener are deemed collectively the "target." For example, User 102 can establish a listener to detect any writes made within a directory. In another example, User 102 can establish a listener to detect a rename of a directory. As stated earlier in this specification, the types of events that can be monitored by a listener are limited only by the file system's ability to determine such changes.

As a part of User 102 establishing a new listener through File System Node 110 UI, a listener registration can be generated that contains information on the listener, for example, the types of actions that User 102 wants the listener to be triggered by, and the target of the listener. The file system node that receives a listener registration, in this example, File System Node 110, adds the listener registration to initiator list 112. It can be appreciated that each file system node within a distributed file system can have unique initiator lists. After adding the listener registration to initiator list 112, file system node 110 sends the listener registration to the remaining nodes in the distributed file system. It can be appreciated that in a distributed file system, the target of a listener event registered by file system node 110 may not reside on file system node 110 and/or may reside on multiple file system nodes. It can be further appreciated that the file system operation that triggers the listener event can originate on nodes that are different from the initiator.

File System Nodes 120, 130, etc., receive the listener registration from File System Node 110. File System Nodes 120, 130, etc. can store the registration information associated with the listener irrespective of whether the target may reside within that node, as file system operation that triggers the listener can originate on any node, regardless of where the target resides. In one implementation, in storing the registration information, the participant node can further store the global event cache version associated with registering the listener as the listener version. It can be appreciated that in versioning registered listeners, sets of notifications can be filtered based on listener versions. Upon successful registration, File System Nodes 120 and 130 in the example can send a registration notice to File System Node 110 instructing File System Node 110 of the successful registration.

In the event File System Node 110 receives a set of registration notices from all nodes in the distributed file system, the listener can be activated within the initiator list 112 of the initiator node. It can be appreciated that by waiting to activate the listener until all nodes of the distributed file system has registered the listener, listener events are only triggered once all nodes have validated successful registration. Thus, a distributed cluster wide lock of the file system, e.g., to prevent a situation of acting on a partially activated listener and potentially providing inaccurate results, is not needed as the listener remains inactive until successful cluster wide registration. In one implementation, inactive nodes, such as nodes no longer functioning, or nodes previously identified as outside the scope of the listener event system need not receive or send registration notices from the initiator node. It can be appreciated that when a listener is triggered by a file system operation, no matter what File System Node the file system operation occurs on, the event cache associated with the file system operation target can reference the File System Node that has the listener stored within its local initiator list in executing the listener. In conjunction with activating the listener, a global event cache 114 can be updated. In some implementations, global event cache 114 can store the most current global event cache version number. When a new listener is established in any File System Node, the global event cache version number can be increased to the next version number. It can be appreciated that global event cache 114 can be used, as described in greater detail with respect to FIG. 2, in validating event caches associated with individual files and directories when processing file system operations and listener events associated with file system operation targets.

In the event File System Node 110 does not receive a set of registration notices from all nodes in the distributed file system, File System Node 110 can send a listener removal message to the set of nodes. It can be appreciated that this process as described for removing listener registration data is not needed to maintain accuracy of the listener system, as a partially registered listener registrations do not become active until registered on all nodes. For example, if the initiator receives a notification from a node that a listener event is triggered for an inactive listener, the initiator node can filter out such notifications as applying to an inactive listener. In one implementation, inactive nodes, such as nodes no longer functioning, or nodes previously identified as outside the scope of the listener event system need not receive or send registration notices from the initiator node. The listener removal message can instruct File System Nodes 120, 130, etc., to remove the previously registered listener mappings. In response to sending the removal message, File System Node 110 can receive a set of listener removal notices and then remove the listener registration from the initiator list within File System Node 110. In one implementation, File System Node 110 can then resend the original listener registration to the set of nodes and repeat the process until it is confirmed that all File System Nodes within the distributed file system have registered the listener.

Processing a Listener Event

In the event a File System Node receives a file system operation associated with a target, listeners associated with the target can be processed to determine whether a listening event is triggered. For example, after a file system operation is received for an associated target, a consistency point can be established. In one implementation, that consistency point is based on the global event cache 114 version at the time the file system operation is made. It can be appreciated that because the global event cache version number is read and locked as a the notification consistency point, when processing the file system operation, any change in the global event cache number that occurs after being locked will not be reflected when processing the file system operation. For example, when a new listener event is registered after the processing of the file system operation locks in the global event cache version that is used to process that file system operation, the new listener event will not be honored.

The consistency point is established when the file system operation commits to a particular version of the event cache, selected at the start of the system call on the target. Event caches for the target set are validated based on the consistency point. It can be appreciated that the consistency point provides a synchronization mechanism that doesn't involve taking an exclusive cluster-wide lock. Thus, subscription changes do not have to contend with other file system operations and are either honored in the entirety or ignored in their entirety based on the consistency point established during the system call.

In conjunction with a consistency point having been established, an impact list can be determined based on the target, wherein the impact list includes a set of files and directories impacted by the file system operation. For example, when a file is being renamed, the impact list may include the former parent directory and the former file name along with the destination parent directory and the destination file name associated with the rename.

It can then be determined if the event caches associated with members of the impact list are valid. For example, as depicted in the partial LIN mapping for File A, File B, and Directory C, in FIG. 1, a set of registered listener mappings or event cache is associated with each entry. An event cache version is also associated with each entry. The consistency point, as determined above, is associated with the current global event cache 117 version. In one example, if the current global event cache 114 version is 117, and the impact list associated with the file system operation was File A and Directory C, the event caches associated with File A and Directory C would be deemed valid as their event cache version matches the global event cache 114 version. However, if the impact list contained File A, File B, and Directory C, one member of the impact list, File B, would have an invalid event cache, e.g., a previous version of the global event cache. When the set of event caches associated with a member of the impact list is not valid, a process of rebuilding event caches can occur, as more fully described with respect to FIG. 2 below.

If the set of event caches associated with members of the impact list are valid, a set of listeners can be established based on the set of event caches. Continuing the example in the previous paragraph regarding an impact list containing File A and Directory C, three listeners are identified between the two lists: L1—Node 2, L17—Node N, and L22—Node 6. With this established list, it can further be determined whether the specific file system operation triggers listeners within this set of listeners. For example, a listener can be established only for write events and the file system operation may be to read File A. Thus, reading File A may not trigger all the registered listener mappings associated with File A. It can be appreciated that in some implementations, it can be determined whether the file system operation necessarily impacts individual listener events within the event cache associated with members of the impact list prior to validating the event caches of the impact list. Thus, invalid event caches that aren't triggered by the file system operation would not unnecessarily invalidate the impact list.

With a set of valid event caches associated with a set of listeners triggered by the file system operation, the file system operation can then be performed, and a set of notifications can be sent based on the set of listeners identified. For example, to send notifications, the initiator node hosting the listener identified in the registered listener mappings can be sent a message to execute or perform the listener that is active within that initiator nodes initiator list. Thus, it can be appreciated that event cache information detailing a set of listeners registered in the LIN need not store the entirety of listener information, such as who to notify, what file system operations trigger the listener, etc. That additional information necessary to send the notification can remain on the initiator node within its initiator list. In one implementation, the set of notifications are batched prior to being sent, and are sent as a single message.

Figure 2:
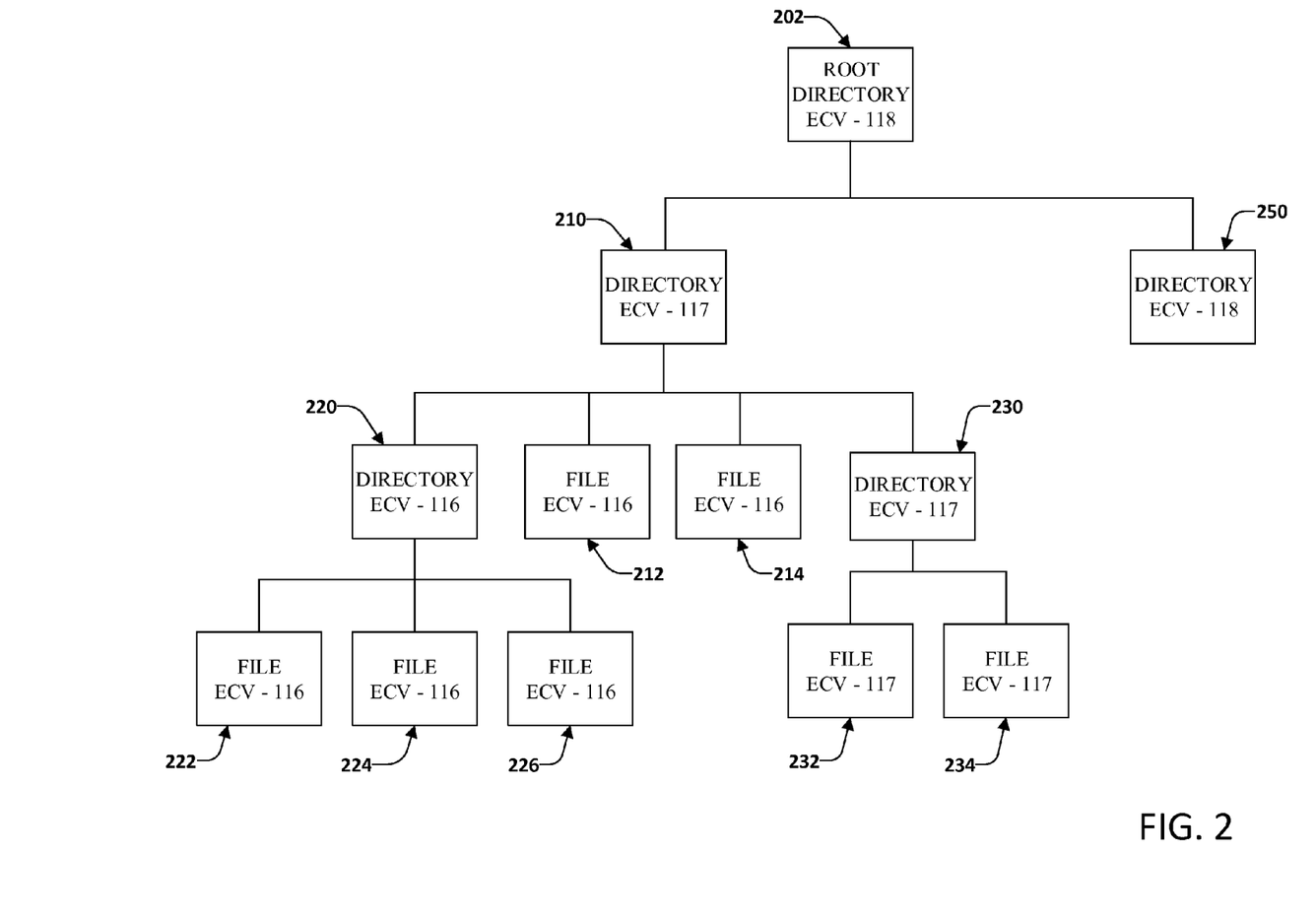
FIG. 2 illustrates an example directory tree.

Referring now to FIG. 2, there is illustrated an example directory tree including associated event cache version ("ECV") information related to the example files and directories depicted. It can be appreciated that files and directory within the example directory tree can have a partial LIN associated with them as depicted in FIG. 1.

In one example, where a consistency point is established at a global event cache version number of 118, and a file system operation target is identified as File 222, it is apparent that the ECV associated with file 222 is of a lesser version that the consistency point of 118. In this example, the event cache associated with at least file 222 can be determined to be invalid based on comparing the ECV of File 222, e.g., 116, to the consistency point of 118. It can be appreciated that all event caches associated with members of the impact list can be assessed for validity. For example, the impact list for a file system operation for File 222 can include a single parent directory 220, or in other cases multiple parent directories, e.g., 220, 210, and 202 respectively. As a part of determining validity, all members of the impact list can be assessed. In this example, Directory 220, Directory 210 and File 222 all have invalid cache versions as their respective version numbers, i.e., 116 and 117, are lesser than the consistency point.

In one implementation, when the set of event caches associated with a member of the impact list is determined to be invalid, a system call associated with the file system operation can be restarted. Thus, event cache revalidation is deferred until after the system call restart. It can be appreciated that in restarting the system call, all system resources associated with the previously active system call initiated to process the file system operations can be dropped, and other threads or system calls can proceed around the system call restart. Thus, in restarting the system call, there is a performance penalty assessed to the restarted system call; however, other threads are not penalized by the previously active system call locking out resources.

After restarting the system call, the set of event caches can be rebuilt based on walking up the directory tree associated with members of the impact list. Continuing the previous example, when File 222 is deemed invalid, we can walk up the directory tree to incorporate any newly versioned registered listener mappings while rebuilding the event caches at every level of the tree walk. Thus, while Directory 220 has the same event cache version, 116, as File 222, and thus does not contain any potential newly registered listener mappings, Directory 210 and Root Directory 202 both may contain additional registered listener mappings as both have ECV's with a newer version. For example, if Directory 210 has a newly registered listener that targets all children of Directory 210 for write requests, this newly added listener to Directory 210 that is not present within the previous ECV of directory 220 or File 222 can be added to the respective registered listener mappings of Directory 220 and File 222. Additionally, any additional registered listening mapping of Root Directory 202 can be added to Directory 210, Directory 220, and File 116. Thus, in updating the event cache associated with File 222, Directory 220 and Directory 210 will also be updated with the most recent event cache information. In updating the respective files and directories during the tree walk, the ECV associated with each File and Directory can also be updated to the current global event cache version, in this example, 118. It is too be appreciated that in updating the event caches during the tree walk, if a later file system operation targets any of the previously updated Files or Directories, those ECV's can be current and in processing the subsequent file system operation, no additional tree walk and event cache updating may be required.

Figure 3:
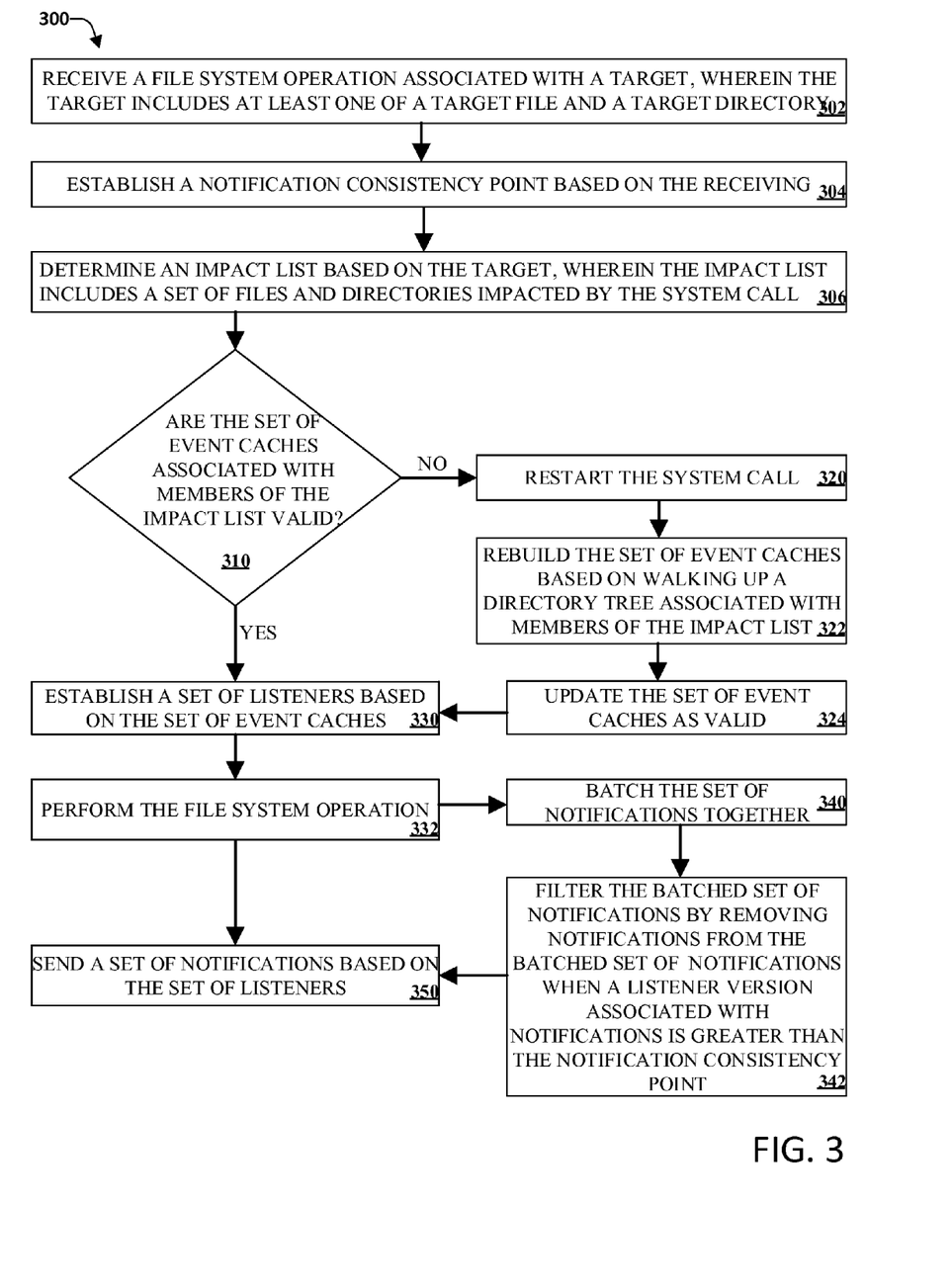
FIG. 3 illustrates an example method for processing a system call for event notifications in accordance with implementations of this disclosure.
Figure 4:
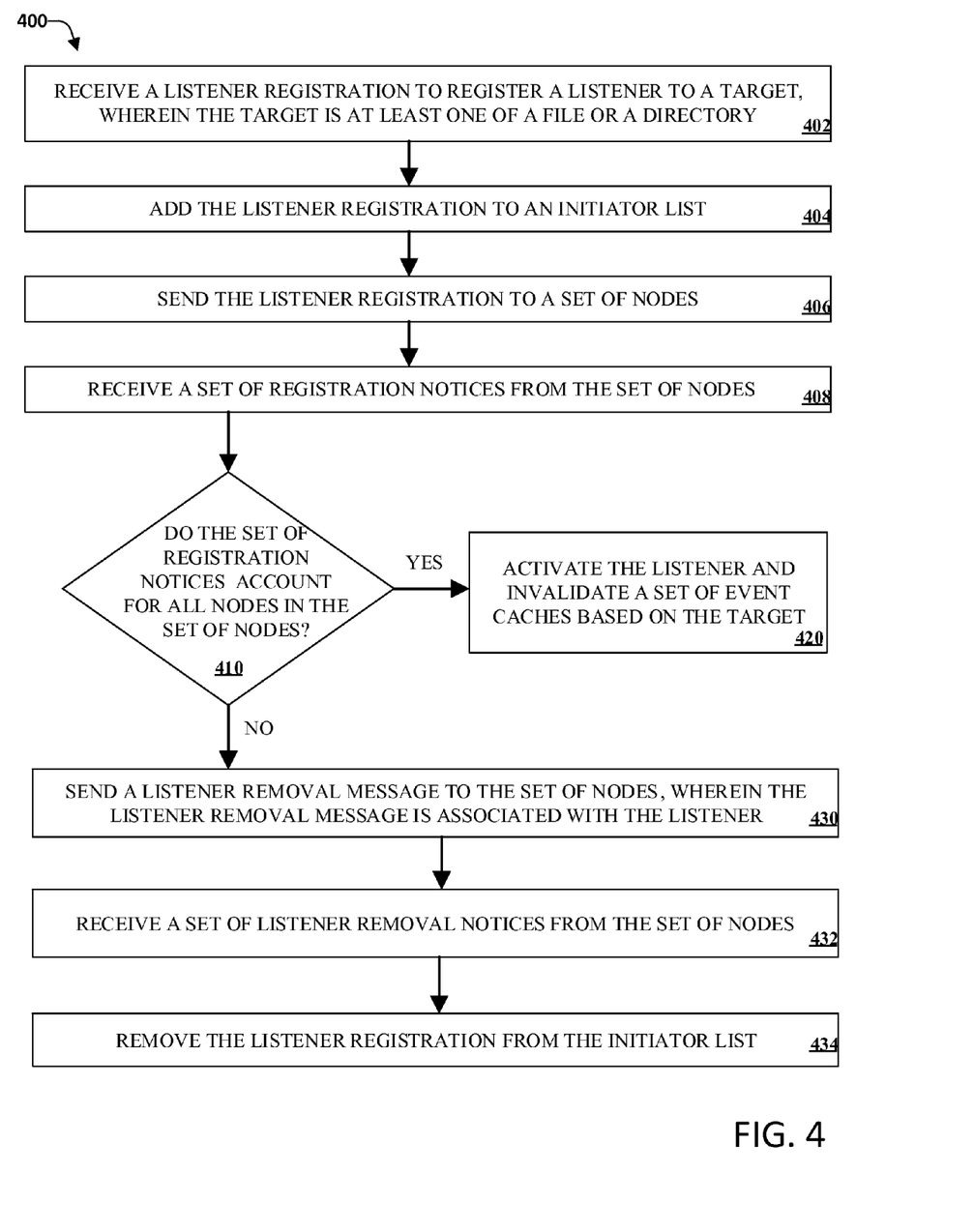
FIG. 4 illustrates an example method for registering a listener event in accordance with implementations of this disclosure.

FIGS. 3-4 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 3 illustrates an example method for processing a system call for event notifications in accordance with implementations of this disclosure. At 302, a file system operation associated with a target can be received wherein the target includes at least one of a target file and target directory. At 304, a notification consistency point can be established based on the receiving. At 306, an impact list can be determined based on the target, wherein the impact list includes a set of files and directories impacted by the file system operation. In one implementation, the impact list includes at least one of parent directories, child directories, and child files. In one implementation, the file system operation is a rename and is further associated with a destination, and wherein the destination includes at least one of a destination file and a destination folder. In one implementation, the event cache of the renamed destination can be inferred from the event cache of the destination parent. In one implementation, the impact list includes the destination. In one implementation, the file system operation is a create and is further associated with a create target and a create parent, and wherein an event cache associated with the create parent is copied and associated with the create target. For example, the create target is a newly created file or directory where the event cache associated with its parent is inferred to be the event cache associated within the create target. In one implementation, a set of listeners associated with the target and the destination parent can be migrated to the destination. For example, in the case of a rename or a create operation, the newly renamed file and/or directory or the newly created file and/or directory can have event cache data migrated from the previously named filed and/or from the destination parent of the newly created file. It can be appreciated that by migrating existing data, the event cache associated with the renamed or created file and/or directory can be updated such that for future file system operations, the event cache associated with the file and/or directory may be valid without having to rebuild the event cache.

At 310, it can be determined whether the set of event caches associated with members of the impact list are valid. In one implementation, validating the set of event caches is based on comparing versions of the set of event caches with the consistency point.

If at 310, the set of event caches associated with members of the impact list are determined to be valid, at 330, a set of listeners can be established based on the set of event caches. In one implementation, the set of listeners is migrated with the target to the destination. At 332, the file system operation can be performed.

In one implementation, at 340, the set of notifications can be batched together prior to sending. It can be appreciated that by batching the set of notifications prior to sending, atomicity can be maintained. At 342, the batched set of notifications can be filtered by removing notification from the batched set of notifications when a listener version associated with notification is greater than the notification consistency point. For example, any partially registered listeners or listeners registered after the notification consistency point has been established can be filtered at this step to maintain version consistency of results and avoid potentially inaccurate or incomplete partial notifications.

At 350, the set of notifications, including in some implementations batched set of notifications, can be sent based on the set of listeners.

If at 310, the set of event caches associated with members of the impact list are determined to be invalid, at 320, the system call can be restarted. In one implementation, restarting the system call drops all system resources previously associated with the system call. It can be appreciated that in restarting the system call, deadlocks associated with validating event caches can be avoided by performing validation in a setting where no contending locks are held. At 322, the set of event caches can be rebuilt based, at least in part, on walking up a directory tree associated with members of the impact list. At 324, the set of event caches can be updated as valid. The method can then proceed at step 330 as described above.

FIG. 4 illustrates an example method for registering a listener event in accordance with implementations of this disclosure. At 402, a listener registration to register a listener to a target can be received wherein the target is at least one of a file or a directory. At 404, the listener can be added to an initiator list. At 406, the listener registration can be sent to a set of nodes. At 408, a set of registration notices can be received from the set of nodes. At 410, it can be determined whether the set of registration notices account for all nodes in the set of nodes.

If a registration noted is received for all nodes within the set of nodes, at 420, the listener can be activated and a set of event caches can be invalidated based on the target. In one implementation, the global event cache can be increased by a single iteration, which in effect, can invalidate any event cache that no longer matches the version of the global event cache.

If a registration noted is not received for all nodes within the set of nodes, at 430, a listener removal message can be sent to the set of nodes, wherein the listener removal message is associated with the listener. At 432, a set of listener notices can be received from the set of nodes. At 434, the listener registration can be removed from the initiator list.

Figure 5:
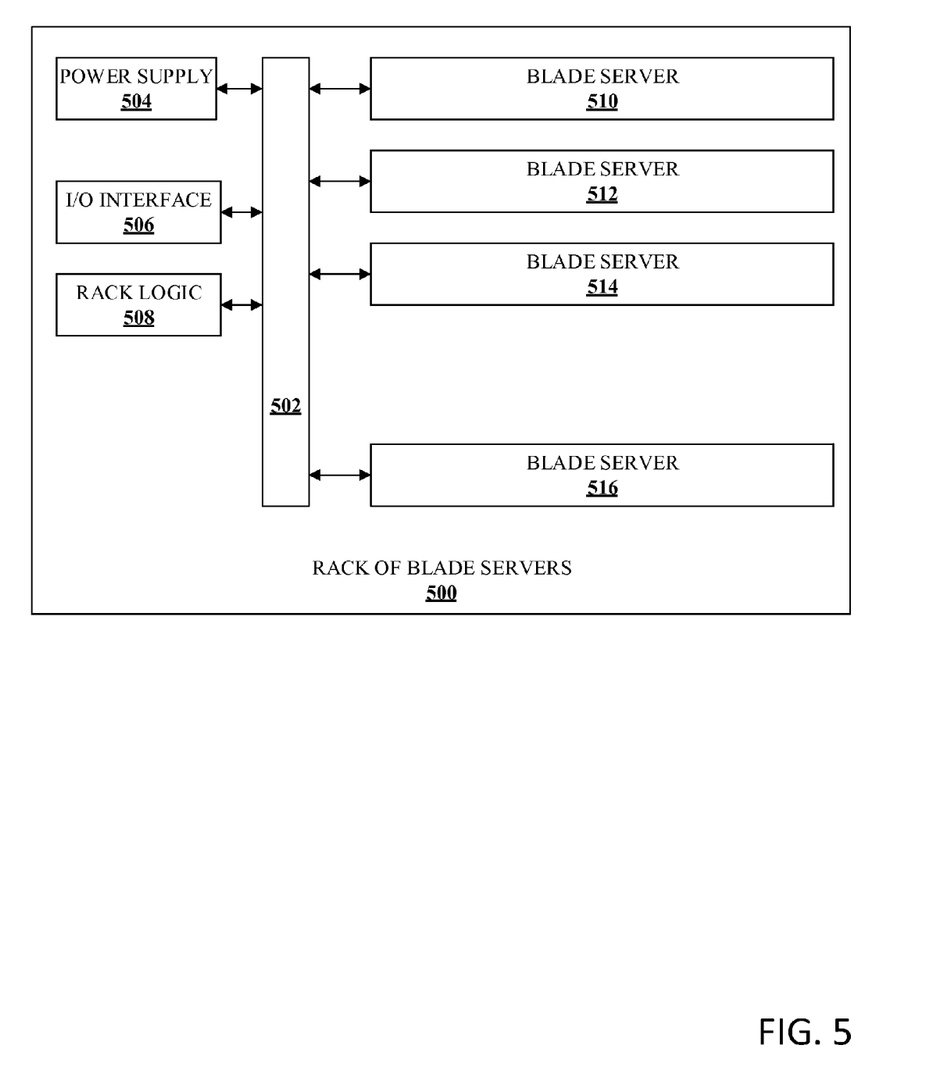
FIG. 5 illustrates an example block diagram of rack of blade servers in accordance with implementations of this disclosure.

FIG. 5 illustrates an example block diagram of rack of blade servers 500 in accordance with implementations of this disclosure. However, the components shown are sufficient to disclose an illustrative implementation. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 500 contains at least a power supply 504, an input/output interface 506, rack logic 508, several blade servers 510, 512, 514, and 516, and backplane 502. Power supply 504 provides power to each component and blade server within the enclosure. The input/output interface 506 provides internal and external communication for components and blade servers within the enclosure. Backplane 508 can enable passive and active communication of power, logic, input signals, and output signals for each blade server.

It can be appreciated that the Rack of Blade Servers 500 can be in communication with a second rack of blade servers and work in conjunction to provide distributed file system. The term blade server can also be used interchangeably with term "node" and can refer to a physical enclosure with a varying amount of CPU cores, random access memory, flash drive storage, magnetic drive storage, etc. For example, a single blade server could contain, in one example, 36 disk drive bays with attached disk storage in each bay.

Figure 6:
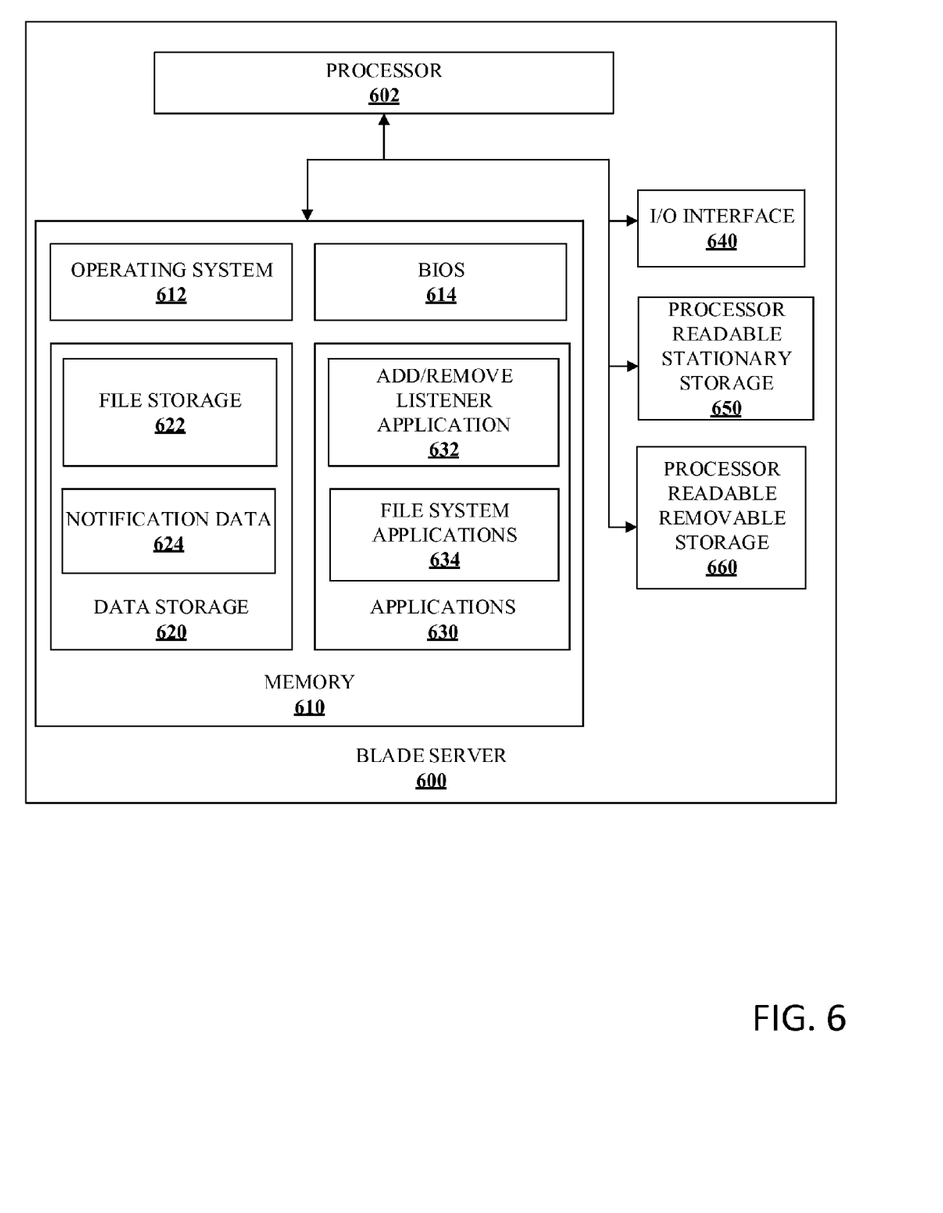
FIG. 6 illustrates an example block diagram of a blade server in accordance with implementations of this disclosure.

FIG. 6 illustrates an example block diagram of a blade server 600 in accordance with implementations of this disclosure. As shown in FIG. 5, a plurality of blade servers may be included in one enclosure that shares resources provided by the enclosure to reduce size, power, and cost.

Blade server 600 includes processor 602 which communicates with memory 610 via a bus. Blade server 600 also includes input/output interface 640, processor-readable stationary storage device(s) 650, and processor-readable removable storage device(s) 660. Input/output interface 640 can enable blade server 600 to communicate with other blade servers, mobile devices, network devices, and the like. Processor-readable stationary storage device 650 may include one or more devices such as an electromagnetic storage device (hard disk), solid state hard disk (SSD), hybrid of both an SSD and a hard disk, and the like. In some configurations, a blade server may include many storage devices. Also, processor-readable removable storage device 660 enables processor 602 to read non-transitive storage media for storing and accessing processor-readable instructions, modules, data structures, and other forms of data. The non-transitive storage media may include Flash drives, tape media, floppy media, disc media, and the like.

Memory 610 may include Random Access Memory (RAM), Read-Only Memory (ROM), hybrid of RAM and ROM, and the like. As shown, memory 610 includes operating system 612 and basic input/output system (BIOS) 614 for enabling the operation of blade server 600. In various embodiments, a general-purpose operating system may be employed such as a version of UNIX, LINUX™, a specialized server operating system such as Microsoft's Windows Server™ and Apple Computer's IoS Server™, or the like.

Applications 630 may include processor executable instructions which, when executed by blade server 600, transmit, receive, and/or otherwise process messages, audio, video, and enable communication with other networked computing devices. Examples of application programs include database servers, file servers, calendars, transcoders, and so forth. Applications 630 may include, for example, file system application 634, and add/modify/remove listener applications 632 according to implementations of this disclosure. In addition, application can exist within 630 for the processing of events.

Human interface components (not pictured), may be remotely associated with blade server 600, which can enable remote input to and/or output from blade server 600. For example, information to a display or from a keyboard can be routed through the input/output interface 640 to appropriate peripheral human interface components that are remotely located. Examples of peripheral human interface components include, but are not limited to, an audio interface, a display, keypad, pointing device, touch interface, and the like.

Data storage 620 may reside within memory 610 as well, storing file storage 622 data such as metadata or LIN data. It can be appreciated that LIN data and/or metadata can relate to rile storage within processor readable stationary storage 650 and/or processor readable removable storage 660. For example, LIN data may be cached in memory 610 for faster or more efficient frequent access versus being stored within processor readable stationary storage 650. In addition, Data storage 620 can also host notification data 624 such as an initiator list 112 or global event cache 114 in accordance with implementations of this disclosure.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
   receiving a file system operation associated with a target, wherein the target includes at least one of a target file and a target directory;
   in response to the receiving, establishing a notification consistency point based on a current global event cache version;
   determining an impact list based on the file system operation and the target, wherein the impact list includes a set of files and directories impacted by the file system operation;
   validating a set of event caches associated with members of the impact list;
   in response to the validating the set of event caches failing:
      restarting a system call associated with the file system operation, wherein restarting the system call preserves the impact list;
      rebuilding the set of event caches based on walking up a directory tree associated with members of the impact list; and
      updating the set of event caches as valid;
   establishing a set of listeners based on the set of event caches;
   performing the file system operation; and
   sending a set of notifications based on the set of listeners.

2. The method of claim 1, wherein the impact list includes at least one of parent directories, child directories, and child files.

3. The method of claim 1, wherein validating the set of event caches is based on comparing versions of the set of event caches with the notification consistency point.

4. The method of claim 1, wherein the file system operation is a create and is further associated with a create target and a create parent, and wherein an event cache associated with the create parent is copied and associated with the create target.

5. The method of claim 1, wherein the file system operation is a rename and is further associated with a destination, and wherein the destination includes at least one of a destination file and a destination folder, and wherein the destination is associated with a destination parent.

6. The method of claim 5, further comprising:
   migrating a set of listeners associated with the target and the destination parent to the destination.

7. The method of claim 1, further comprising:
   batching the set of notifications together, wherein the batching occurs prior to the sending.

8. The method of claim 7, further comprising:
   filtering the set of batched notifications by removing notifications from the set of batched notifications when a listener version associated with notifications is greater than the notification consistency point.

9. A computer readable medium with program instructions stored thereon to perform the following acts:
   receiving a file system operation associated with a target, wherein the target includes at least one of a target file and a target directory;
   in response to the receiving, establishing a notification consistency point based on a current global event cache version;

determining an impact list based on the file system operation and the target, wherein the impact list includes a set of files and directories impacted by the file system operation;

validating a set of event caches associated with members of the impact list;

in response to the validating the set of event caches failing:
  restarting a system call associated with the file system operation, wherein restarting the system call preserves the impact list;
  rebuilding the set of event caches based on walking up a directory tree associated with members of the impact list; and
  updating the set of event caches as valid;

establishing a set of listeners based on the set of event caches;

performing the file system operation; and sending a set of notifications based on the set of listeners.

10. The computer readable medium of claim 9, wherein the impact list includes at least one of parent directories, child directories, and child files.

11. The computer readable medium of claim 9, wherein validating the set of event caches is based on comparing versions of the set of event caches with the notification consistency point.

12. The computer readable medium of claim 9, wherein the file system operation is a create and is further associated with a create target and a create parent, and wherein an event cache associated with the create parent is copied and associated with the create target.

13. The computer readable medium of claim 9, wherein the file system operation is a rename and is further associated with a destination, and wherein the destination includes at least one of a destination file and a destination folder, and wherein the destination is associated with a destination parent.

14. The computer readable medium of claim 13, further comprising:
  migrating a set of listeners associated with the target and the destination parent to the destination.

15. The computer readable medium of claim 9, further comprising:
  batching the set of notifications together, wherein the batching occurs prior to the sending.

16. The computer readable medium of claim 15, further comprising:
  filtering the set of batched notifications by removing notifications from the set of batched notifications when a listener version associated with notifications is greater than the notification consistency point.

17. A system comprising a memory and a processor configured to:
  receive a file system operation associated with a target, wherein the target includes at least one of a target file and a target directory;
  in response to receiving the file system operation, establish a notification consistency point based on a current global event cache version;
  determine an impact list based on the file system operation and the target, wherein the impact list includes a set of files and directories impacted by the file system operation;
  validate a set of event caches associated with members of the impact list;
  in response to the validating the set of event caches failing:
    restart a system call associated with the file system operation, wherein restarting the system call preserves the impact list;
    rebuild the set of event caches based on walking up a directory tree associated with members of the impact list; and
    update the set of event caches as valid;
  establish a set of listeners based on the set of event caches;
  perform the file system operation; and
  send a set of notifications based on the set of listeners.

18. The system of claim 17, wherein validating the set of event caches is based on comparing versions of the set of event caches with the notification consistency point.

19. The computer readable medium of claim 17, further comprising:
  batch the set of notifications together, wherein the batching occurs prior to the sending.

20. The system of claim 19, further comprising:
  filter the set of batched notifications by removing notifications from the set of batched notifications when a listener version associated with notifications is greater than the notification consistency point.

* * * * *